US008228947B2

(12) United States Patent
Pirskanen et al.

(10) Patent No.: US 8,228,947 B2
(45) Date of Patent: Jul. 24, 2012

(54) METHOD AND APPARATUS FOR COMMUNICATING PROTOCOL DATA UNIT IN A RADIO ACCESS NETWORK

(75) Inventors: Juho Pirskanen, Tampere (FI); Esa Malkamaki, Espoo (FI); Luis Barreto, Surrey (GB)

(73) Assignee: Nokia Corporation, Espoo (FI)

( * ) Notice: Subject to any disclaimer, the term of this patent is extended or adjusted under 35 U.S.C. 154(b) by 861 days.

(21) Appl. No.: 11/975,138

(22) Filed: Oct. 16, 2007

(65) Prior Publication Data

US 2008/0089285 A1  Apr. 17, 2008

Related U.S. Application Data

(60) Provisional application No. 60/852,331, filed on Oct. 16, 2006, provisional application No. 60/852,606, filed on Oct. 17, 2006.

(51) Int. Cl.
*H04J 3/16* (2006.01)
(52) U.S. Cl. ........................................... 370/470
(58) Field of Classification Search .................. None
See application file for complete search history.

(56) References Cited

U.S. PATENT DOCUMENTS

| 2002/0172208 | A1* | 11/2002 | Malkamaki | 370/400 |
|---|---|---|---|---|
| 2003/0210669 | A1* | 11/2003 | Vayanos et al. | 370/335 |
| 2004/0219955 | A1 | 11/2004 | daCosta | 455/574 |
| 2005/0053035 | A1* | 3/2005 | Kwak et al. | 370/331 |
| 2005/0060364 | A1* | 3/2005 | Kushwaha et al. | 709/200 |
| 2005/0114489 | A1* | 5/2005 | Yonge et al. | 709/223 |
| 2005/0266846 | A1 | 12/2005 | Kim | 455/436 |
| 2008/0080424 | A1* | 4/2008 | Torsner et al. | 370/330 |
| 2008/0165755 | A1* | 7/2008 | Marinier et al. | 370/342 |
| 2009/0207810 | A1* | 8/2009 | Petrovic et al. | 370/331 |
| 2010/0095183 | A1* | 4/2010 | Petrovic et al. | 714/748 |

FOREIGN PATENT DOCUMENTS

| EP | 1211838 A1 | 6/2001 |
|---|---|---|
| EP | 1594247 A2 | 5/2005 |
| KR | 2002-10148 | 2/2002 |
| WO | WO00-70457 | 11/2000 |

OTHER PUBLICATIONS

3GPP TSG-RAN WG2 Meeting #58, Kobe Japan, May 7-11, 2007—R2-072261.

(Continued)

*Primary Examiner* — Anh-Vu Ly
(74) *Attorney, Agent, or Firm* — Harrington & Smith

(57) ABSTRACT

A new protocol data unit is used in communications in a radio access network. When a user equipment requests a radio resource controller connection, the UE includes its identity in the request message. In establishing the connection to UE, a serving radio network controller allocates a logical channel to the UE for communications and identifies the logical channel in the header of the protocol data unit so as to allow a receiver of the PDU to know the UE identity in an out-of-band signaling fashion, depending upon a state of the transmitter of the PDU. When the transmitter changes its state, the receiver can change state accordingly. The new PDU structure allows continuous reception of the HS-DSCH downlink channel during state transition form CELL_FACH or CELL_PCH or URA_PCH to CELL_DCH and vice versa. This new PDU structure also allows continuous HS_DSCH retransmissions.

17 Claims, 8 Drawing Sheets

OTHER PUBLICATIONS

3GPP TSG-RAN WG2 Meeting #58, Kobe Japan, May 7-11, 2007—R2-072258.

3GPP TS 25.308 V7.3.0 (Jun. 2007) 3$^{rd}$ Generation Partnership Project; Technical Specification Group Radio Access Network; High Speed Downlink Packet Access (HSDPA); overall description; Stage 2, (Release 7).

3GPP TS 25.321 V7.5.0 (Jun. 2007) 3$^{rd}$ Generation Partnership Project; Technical Specification Group Radio Access Network; Medium Access Control (MAC) protocol specification (Release 7).

3GPP ETSI TS 125 308 V7.0.0 (Mar. 2006) Release 7 Universal Mobile Telecommunications System (UMTS) Utra High Speed Downlink Packet Access (HSDPA); Overall description; Stage 2, ETSI Standards, European Telecommunications Standards Institute, Sophia Antipo, FR. vol. 3-R2, No. V700, Mar. 2006 pp. 12-16, 30, 31.

3GPP ETSI TS 125 331 V7.2.0 (Sep. 2006) Release 7 Universal Mobile Telecommunications System (UMTS); Radio Resource Control (RRC); Protocol specification, ETSI Standards, European Telecommunications Standards Institute, Sophia-Antipo, FR, vol. 3-R2, No. V720, Sep. 2006 pp. 1-16, 29-31.

3GPP ETSI TS 125 321 V7.2.0 (Sep. 2006) Universal Mobile Telecommunications System (UMTS); Medium Access Control (MAC) protocol specification (3GPP TS 25.321 version 7.2.0. Release 7) ETSI Standards, European Telecommunications Standards Institute, Sophia-Antipo, FR. vol. 3-R2, No. V720 Sep. 2006 pp. 1-10, 14, 15, 29.

Segmentation in E-UTRAN—3GPP TSG-RAN WG2, R2-060827, Nokia, Mar. 27, 2006 pp. 1-4 XP002495779.

Support Flexible MAC-hs Type, 3GPP TSG-RAN-WG2, R2-061213, Huawei, May 8, 2006, pp. 1-2, XP002495780.

E-RRC and E-MAC Functions, 3GPP TSG-RAN WG2, R2-052891, Nokia, Nov. 5, 2005, pp. 1-3, XP002495781.

Korean Office Action dated Nov. 30, 2010, Original and translation.

U.S. Appl. No. 09/314,580, filed May 18, 1999, Morris et al.

Korean Office Action dated Aug. 27, 2011, Original and translation.

* cited by examiner (a)

| VF | Logical ch ID | TSN | Length | SC | RLC Header | Payload |

MAC-hs header for SRB#0 carrying CCCH messages with common H-RNTI (b)

| VF | Logical ch ID | U-RNTI | TSN | Length | SC | RLC Header | Payload |

MAC-hs header for SRB#1 when common H-RNTI (c)

| VF | Logical ch ID | TSN | Length | SC | RLC Header | Payload |

MAC-hs header for SRB#2-4 and RBs DCCH and DTCH messages with UE dedicated H-RNTI in CELL_FACH or CELL_DCH state (d)

| VF | Logical ch ID | TSN | Length | SC | RLC Header | Payload |

MAC-hs header for MTCH, MSCH and MCCH messages. Common H-RNTI used for MCCH and MSCH and MBMS service specific H-RNTI used to separate MBMS services (e)

| VF | Logical ch ID | TSN | Length | SC | RLC Header | Payload |

MAC-hs header for BCCH and PCCH messages with common H-RNTI to indicate BCCH, PCCH transmission

FIG. 4

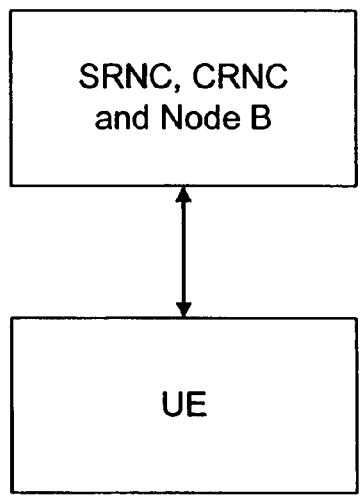
(a)
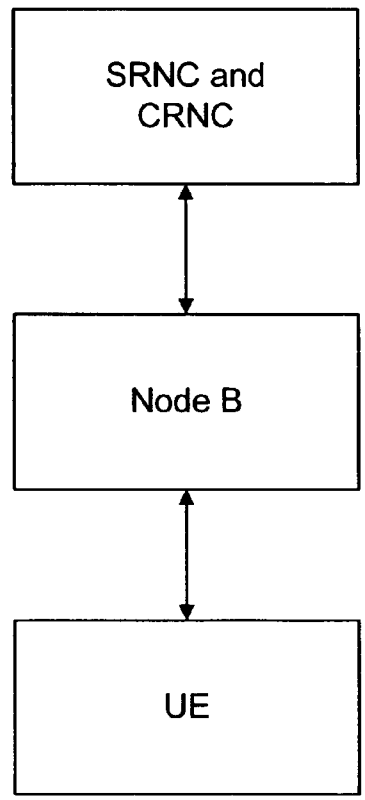
(b)
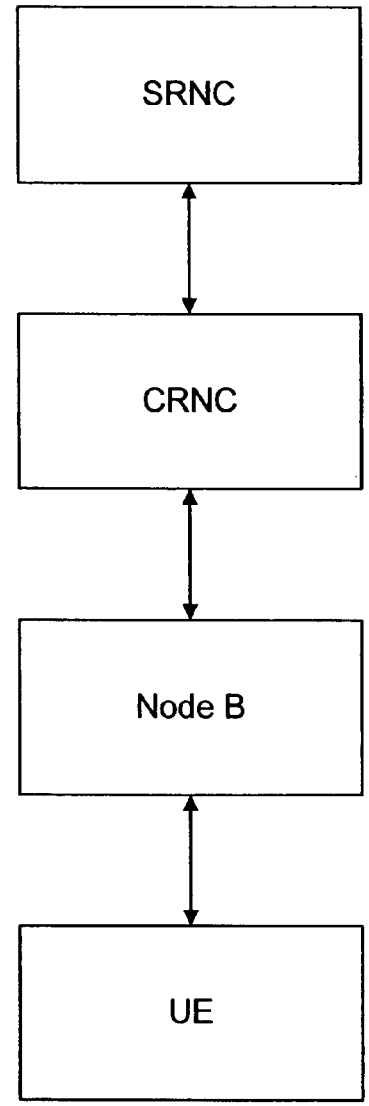
(c)
FIG. 6

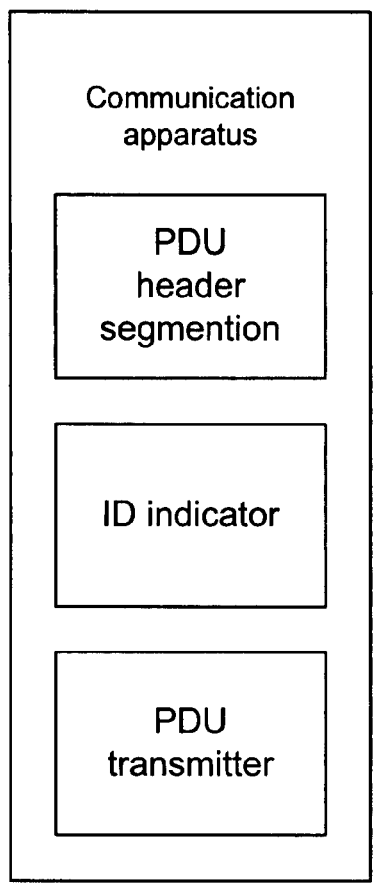 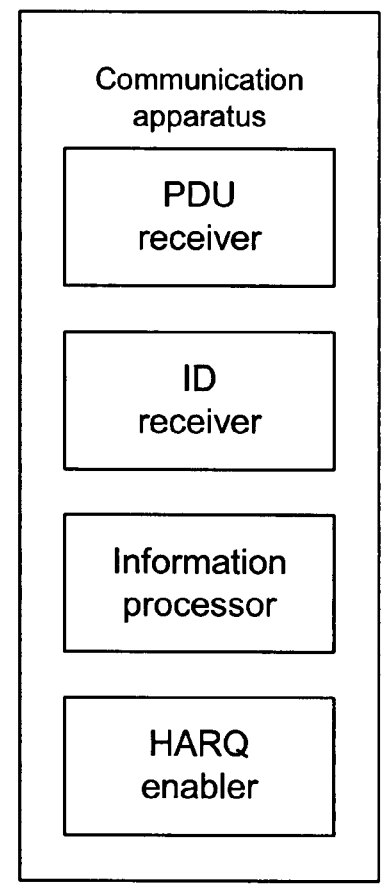
(a) (b)
FIG. 7

METHOD AND APPARATUS FOR COMMUNICATING PROTOCOL DATA UNIT IN A RADIO ACCESS NETWORK

This application claims priority to co-pending U.S. Patent Applications No. 60/852,331, filed Oct. 16, 2006, and No. 60/852,606, filed Oct. 17, 2006.

FIELD OF THE INVENTION

The present invention relates generally to the downlink transmission in a Universal Mobile Telecommunications System (UMTS) Terrestrial Radio Access Network (UTRAN) or long term evolutions of UTRAN and, more particularly, to the UTRAN high speed downlink packet access (HSDPA) operation in CELL_FACH (forward access channel) state.

BACKGROUND OF THE INVENTION

As is known in the field, a further development of the wideband code division multiple access (WCDMA)/universal mobile telecommunications system (UMTS) communication system is the definition of the system known as high speed downlink packet access (HSDPA). HSDPA operates as a time-shared communications channel which provides the potential for high peak data rates as well as the possibility for having a high spectral efficiency. HSDPA improves system capacity and increases user data rates in the downlink, that is, for transmission of data from a radio base station (BTS) to a user equipment (UE). BTS is also known as a Node B server in a UMTS system.

FIG. 1 illustrates a prior art radio interface protocol structure of HSDPA. It shows the relationship between the different layers among UE, Node B and various radio network controllers (RNCs). In FIG. 1, RLC is the radio link control layer, and MAC is the medium access control layer and PHY is the physical layer. MAC-hs (MAC high-speed) is a new MAC entity terminated in Node B for controlling the HS-DSCH transport layer. MAC-c (common MAC) is an entity in the UE, which transfers MAC-c PDU (protocol data unit) to the peer MAC-c entity in the RNC using the services of the physical layer. MAC-c/sh is responsible for the PCH (Paging Channel), FACH (Forward Access Channel), DSCH (Downlink Shared Channel) and RACH (Random Access Channel). MAC-d (dedicated MAC) is responsible for dedicated channels (DCHs) and is retained in the serving RNC, whereas MAC-c/sh is in the controlling RNC. L1, L1, L2 are radio resources for the radio resource controller connection. L1 is a physical layer and L2 is a data link layer.

An HS-DSCH channel is a downlink transport channel shared by several UEs. The HS-DSCH is associated with one downlink DPCH (downlink dedicated physical channel) or F-DPCH per active user, and one or several shared control channels (HS-SCCH). The HS-DSCH can be transmitted over the entire cell or over only part of the cell using beam-forming antennas, for example.

In terms of channels, there are three types of UMTS channel levels in a UMTS system so as to allow a UE to communicate with other network components: physical channels, transport channels and logical channels. The logical channels provide transport bears for information exchange between MAC protocol and RLC protocol. Transport channels provide the bearers for information between MAC protocol and the physical layer. Physical channels, which are identified by frequencies, spreading codes, etc., provide the transport bearers for different transport channels.

The logical channel can be used for communicating a PDU to or from a UE in a radio access network. Among various fields in the PDU, one is used to identify the UE (UE-id) and one is used to indicate the UE-id type. Most of the control signaling between UE and UTRAN is Radio Resource Control (RRC) messages. When the serving radio network controller (S-RNC) establishes the radio resource control (RRC) connection to a UE and decides to use a dedicated channel for this particular RRC connection, it allocates a UTRAN radio network temporary identity (RNTI) and radio resources L1, L2 for the RRC connection. An RRC connection set up message is sent from the S-RNC to the UE. It is known that UE has two basic operation modes, the Idle Mode and Connection Mode. The transition from the Idle Mode to the UTRAN Connection Mode is initiated by the UE by transmitting a request for RRC connection. When the UE receives a message from the network confirming the establishment of the RRC connection, the UE enters the CELL_FACH (forward access channel) state or CELL_DCH (dedicated channel) state of the UTRAN Connection Mode.

Although HSDPA is an efficient method for delivering relatively large amounts of data in relatively small time periods (the transmission time interval, or TTI, for a HSDPA system is 2 ms). This performance, however, can only be used when the user equipment is operating within the dedicated channel state (CELL_DCH state). In other words, the performance can be carried out only after a physical layer connection between UE and the BTS has been established and the layer connection has dedicated channels allocated to it. The transition from the UE Idle state to the dedicated channel state (CELL_DCH state) and establishing an HSDPA connection may take up to a second. When the amount of data required to be transmitted is relatively small, the state transition to the CELL_DCH state can take longer than the actual data transmission.

Moreover, when the UE is in the process of changing states to the CELL_DCH state, the required state change has to be addressed to the UE by the forward access channel (FACH). This required state change is significantly slower and less robust than the later HSDPA transmission channels. Before and during the transition to the CELL_DCH state, the CELL_FACH state requires that both the downlink dedicated control channel (DCCH) and the downlink dedicated traffic channel (DTCH) are mapped onto the forward access channel (FACH).

To avoid data loss during state transition between CELL_FACH state and CELL-DCH state, even when HSDPA MiMo (multiple-input multiple-output for transmit/receive diversity) is used, it is possible to stop downlink data transmission for certain time as the network is not aware of the exact time instance when UE is able to operate in CELL_DCH state and receive a correct downlink channel and the PDU format. In particular, it is possible to directly map MAC-d PDUs to MAC-c PDU as defined in Rel99 and then to map MAC-c PDU to MAC-hs PDU as shown in FIG. 2a (multiplexing structure) and FIG. 2b (PDU header structure).

In a non-HS-DSCH channel, a MAC PDU has a MAC header section and a MAC SDU (Service Data Unit) section. The MAC header section has four fields: a Coding of Target Channel Type Field (TCTF), a UE-id Type field, a UE-id (UE identity) field and a C/T field. The C/T field is used to provide identification of the logical channel instance when multiple logical channels are carried on the same transport channel. The TCTF field is used to provide identification of the logical channel class on FACH and RACH transport channels. The C/T field is also used to provide identification of the logical channel type on dedicated transport channels on FACH and RACH when used for user data transmission.

In a MAC-hs PDU consists of one MAC-hs header and one or more MAC-hs SDUs (Service Data Units). A maximum of one MAC-hs PDU can be transmitted in a TTI per UE. The MAC-hs header is of variable size. The MAC-hs PDU in one TTI (Transmission Time Interval) belongs to the same reordering queue. TTI indicates how often data arrives from higher layers to the physical layer. As shown in FIG. 2b, the MAC-hs header includes a priority Queue ID to identify a priority level of the MAC-d flow, a transmission sequence number (TSN) and one or more groups of three fields (SID, N and F), wherein SID (Size Index) indicates the length of each SDU, N indicates the number of SDUs having the length of the SID, and F (Flag) indicates whether the next field contains the SID length information. Thus, the group or groups of SID, N and F are indicative of the number or size of one or more subsequent protocol data units. Queue ID is also indicative of the reordering queue in the receiver. In addition, in front of the MAC-hs header, a version flag (VF) is also provided.

In the above-described multiplexing scheme using the PDU structure, the transition from the UE to the dedicated channel state (CELL_DCH state) and establishing an HSDPA connection may take more time than the actual data transmission, especially when the amount of data required to be transmitted is relatively small. The PDU structure as shown above can be further improved.

SUMMARY OF THE INVENTION

The present invention provides a method and apparatus for communicating a protocol data unit (PDU) between a user equipment device and another network component over a logical channel in a radio access network, using a different PDU structure. In a scenario when a user equipment sends a request message to a serving radio network controller (SRNC) requesting a radio resource controller (RRC) connection, the user equipment includes its identity (UE-id) in the request message. In establishing the RRC connection to UE, SRNC allocates a radio network temporary identity and radio resources for the connection and sends an RRC set up message to UE, including a coded UE identity as part of the RRC message. Additional scenario where UE ID could be updated are when UE sends Cell Update or URA Update message to the network (NW) and network sends Cell Update Confirm message back to the UE. Furthermore, in the scenario where the UE is having all necessary ID allocated, the PDUs can be transmitted between UE and NW via common channels so that UE identity needs to be encompassed in each transmission.

As such, the identity of a user equipment can be indicated in out-of-band signaling. This out-of-band signaling is used in a format of the PDU known to the network component receiving the PDU. The network component receiving the PDU knows which identity is used in the out-of-band signaling depending upon a state of the network component. When the network component transmitting the PDU has changed from one state to another, the out-of-band signaling allows the network component receiving the PDU to know the state change, so that the receiver changes the state if the transmitter has changed the state.

The present invention uses a new PDU structure to transfer data and signaling to the user equipment in the Idle state or in the UTRAN connected states (CELL_DCH, CELL_FACH, CELL_PCH or URA_PCH). As it is known in the art, the transition from the Idle Mode to the UTRAN Connection Mode is initiated by the UE by transmitting a request for RRC connection. When the UE receives a message from the network confirming the establishment of the RRC connection, the UE enters the CELL_FACH (forward access channel) state and CELL_DCH (dedicated channel) state of the UTRAN Connection Mode. The new PDU structure is used in both CELL_FACH and CELL_DCH states when HS-DSCH reception is enabled in those states. Furthermore, the new PDU structure is used as a single multiplexing layer for multiplexing different logical channels to an HS-DSCH transport channel.

One improvement regarding the PDU structure change, according to the present invention, is to allow continuous reception (without breaks in consecutive TTIs) of the HS-DSCH downlink channel during the state transition from CELL_FACH or CELL_PCH or URA_PCH (for UTRAN Registration Area) to CELL_DCH or vice versa.

One improvement regarding the PDU structure change, according to the present invention, is to allow HS-DSCH HARQ retransmissions to continue during the state transition from CELL_FACH to CELL_DCH or vice versa. This is possible as PDU structure in both states is identical and, from receiver point of view, there is no difference if some first HARQ transmission occurred in a different state than the last HARQ transmission when the PDU were able to be decoded correctly.

One improvement regarding the PDU structure change, according to the present invention, is to allow a variable MAC-hs SDU size by utilizing the length field.

One improvement regarding the PDU structure change, according to the present invention, MAC-hs segmentation and concatenation in CELL_DCH and CELL_FACH states. The segmentation is achieved by utilizing the length and SC fields and concatenation is achieved by repeating the header fields.

One improvement regarding the PDU structure change, according to the present invention, is to avoid length indicators in RLC to indicate SDU boarders. This is achieved by using last field in the RLC header to indicate the end of the SDU. The RLC header has a last segment flag (L) to indicate the last segment, a polling bit (P) to indicate a status report is required, and a D/C field to indicate whether the PDU is a control PDU or an AM PDU. It should be also noted that actual order of the different fields in MAC-hs protocol header not essential for this invention.

One improvement regarding the PDU structure change, according to the present invention, is to reduce the overall L2 overhead introduced by RLC and MAC layers in CELL_FACH, CELL_PCH, URA_PCH and CELL_DCH state.

One improvement regarding the PDU structure change, according to the present invention, is to introduce fully octet aligned L2 protocol headers for RLC and MAC layers in CELL_FACH, CELL_PCH, URA_PCH and CELL_DCH state to reduce L2 processing in high speed data connections.

Other aspects of the PDU structure change, according to the present invention, include the removal of the TCTF, UE-id type and UE-id fields from the MAC-hs header; the replacement of the Queue ID field in the MAC-hs header by a Logical channel ID field, the replacement of the SID, N1 and F1 fields by Length field and SC field. Moreover, the MAC-d multiplexing and the MAC-c multiplexing are avoided.

BRIEF DESCRIPTION OF THE DRAWINGS

FIGS. 4a to 4e show different PDU structures for different logical channels, according to the present invention.

FIGS. 6a to 6c show a radio access network having a plurality of network components using the PDU structure, according to the present invention.

FIG. 7a shows an apparatus in the radio access network configured to receive and process the PDU, according to various embodiments of the present invention.

FIG. 7b shows an apparatus in the radio access network configured for implementing the PDU, according to various embodiments of the present invention.

DETAILED DESCRIPTION OF THE INVENTION

The present invention is concerned mainly with the uplink transmission in a Universal Mobile Telecommunications System (UMTS) Terrestrial Radio Access Network (UTRAN) or long term evolutions of UTRAN and, more particularly, to the UTRAN high speed downlink packet access (HSDPA) operation in CELL_FACH (forward access channel) state and flexible RLC size and MAC-hs segmentation in CELL_DCH state. The present invention provides a new PDU structure for the communications between one network component of a radio access network to another network component. The present invention also provides a method for communicating the new PDU to or from a user equipment (UE) in the radio access network.

When the serving radio network controller (SRNC) establishes the radio resource controller (RRC) connection to a UE and decides to use a dedicated channel for this particular RRC connection, it allocates a UTRAN radio network temporary identity (RNTI) and radio resources L1,, L2 for the RRC connection. An RRC connection set up message is sent from the S-RNC to the UE. The RRC connection set up message contains the permanent UE identity that the UE includes in the RRC Connection Request message and the MAC-hs PDU format as shown in FIG. 4a. This UE identity is coded as part of RRC message and not present in MAC PDU. When the RRC connection is established, the UTRAN assigns the U-RNTI, C-RNTI and H-RNTI identifiers to the UE. The U-RNTI is valid inside UTRAN in CELL_FACH state and in CELL/URA_PCH state and the C-RNTI is valid inside the cell in CELL_FACH state. Here URA denotes a UTRAN registration area. In HSDPA operation in CELL_DCH state, each UE is assigned a unique H-RNTI that is used to identify the intended receiver of each transmitted packet already in the physical layer. In operation, all RRC messages are exchanged between a terminal and the RNC through the signaling radio bearers (SRBs). SRB characteristics are determined based on the mode of operation of the RLC and the type of logical channel used. A common control channel (CCCH) and dedicated control channel (DCCH) are used for the SRBs. Among the SRBs, SRB#0 is used for the uplink (UL) with the RLC layer operating in a transparent mode (TM) or for the downlink (DL) with the RLC layer operating in a unacknowledged mode (UM). The logical channel for SRB#0 is CCCH. With SRB#1, the RLC layer is operating in the UM and the logical channel is DCCH. With SRB#2 through SRB#4, the RLC layer is operating in an acknowledged mode (AM) and the logical channel is DCCH. With SRB#5 through SRB#31, the RLC layer is operating in the TM and the logical channel is DCCH.

Figure 3:
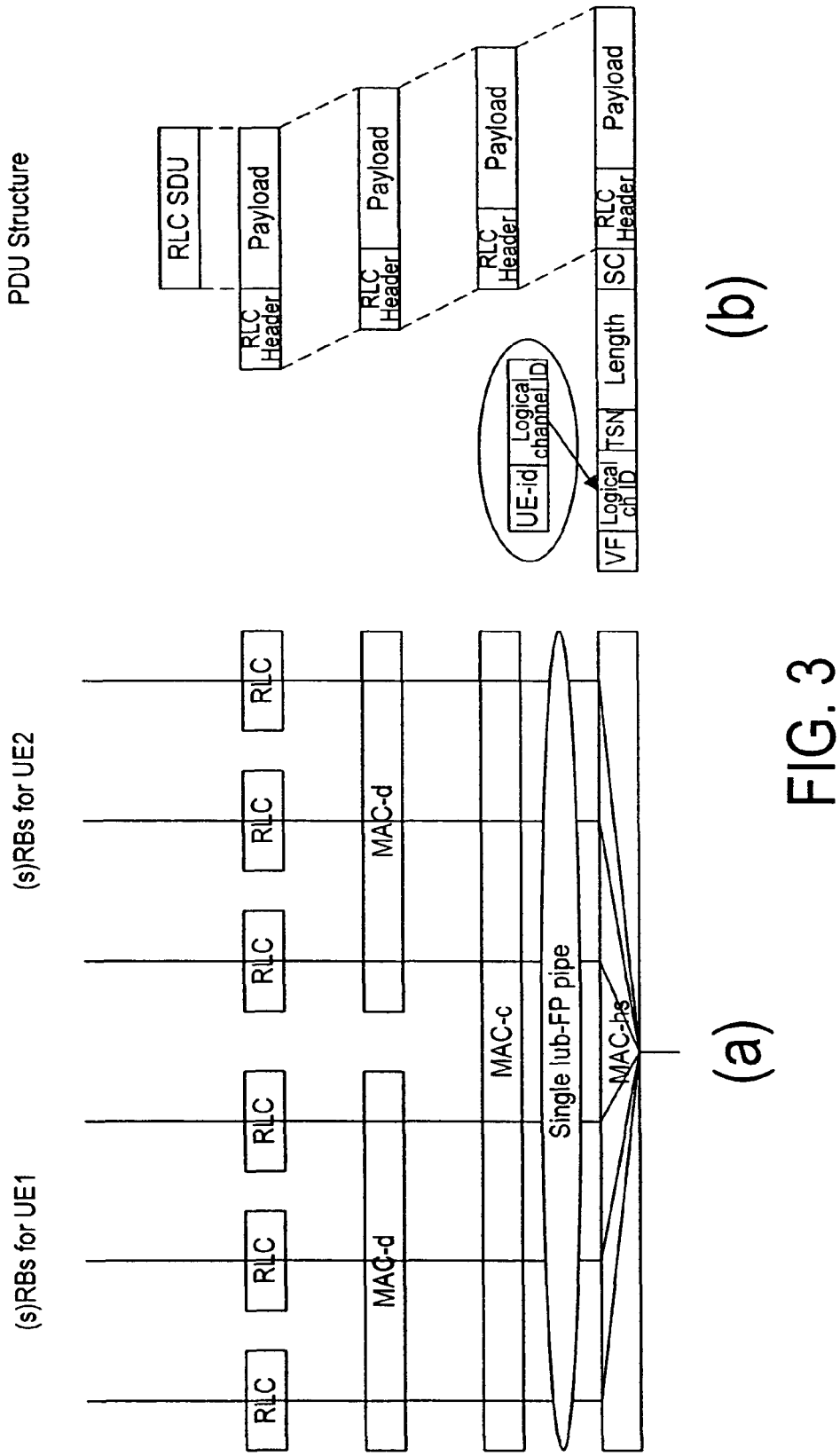
FIGS. 3a and 3b illustrate the multiplexing and L2 PDU structure based on a format, according to the present invention.

According to the present invention, the user specific C-RNTI can be carried in HS-SCCH by mapping the C-RNTI to H-RNTI in Node B. Alternatively the network can allocate H-RNTI separately to be used also in CELL_FACH, CELL/URA_PCH states. During connection setup phase or when previously allocated UE dedicated RNTI is invalid (cell reselection) the UE can use RNTI value broadcasted in system information broadcast (SIB) for receiving RRC message to be used to allocated UE specific RNTI. As the UE specific id (UE-id) is carried in HS-SCCH, the PDU structure can be optimized so that the PDU header does not contain the C-RNTI. Thus, a new PDU structure can be used. The new PDU, according to the present invention, is shown in FIG. 3b. In order to show a MAC multiplexing scheme, according to the present invention, MAC multiplexing structure is also shown alongside the PDU structure.

The present invention can be carried out with a number of improvements.

Figure 1:
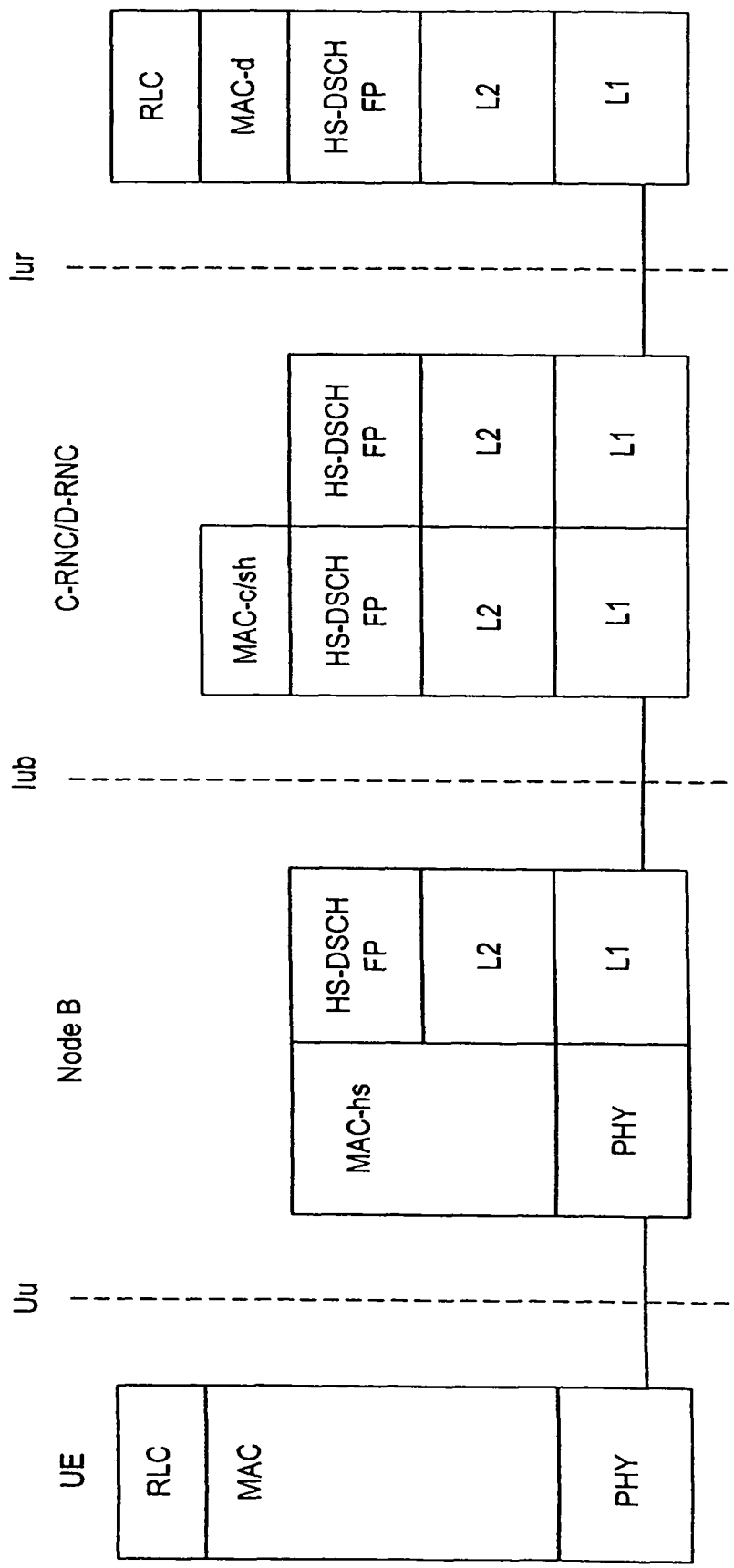
FIG. 1 illustrates the radio interface protocol architecture of HSPDA.
Figure 2:
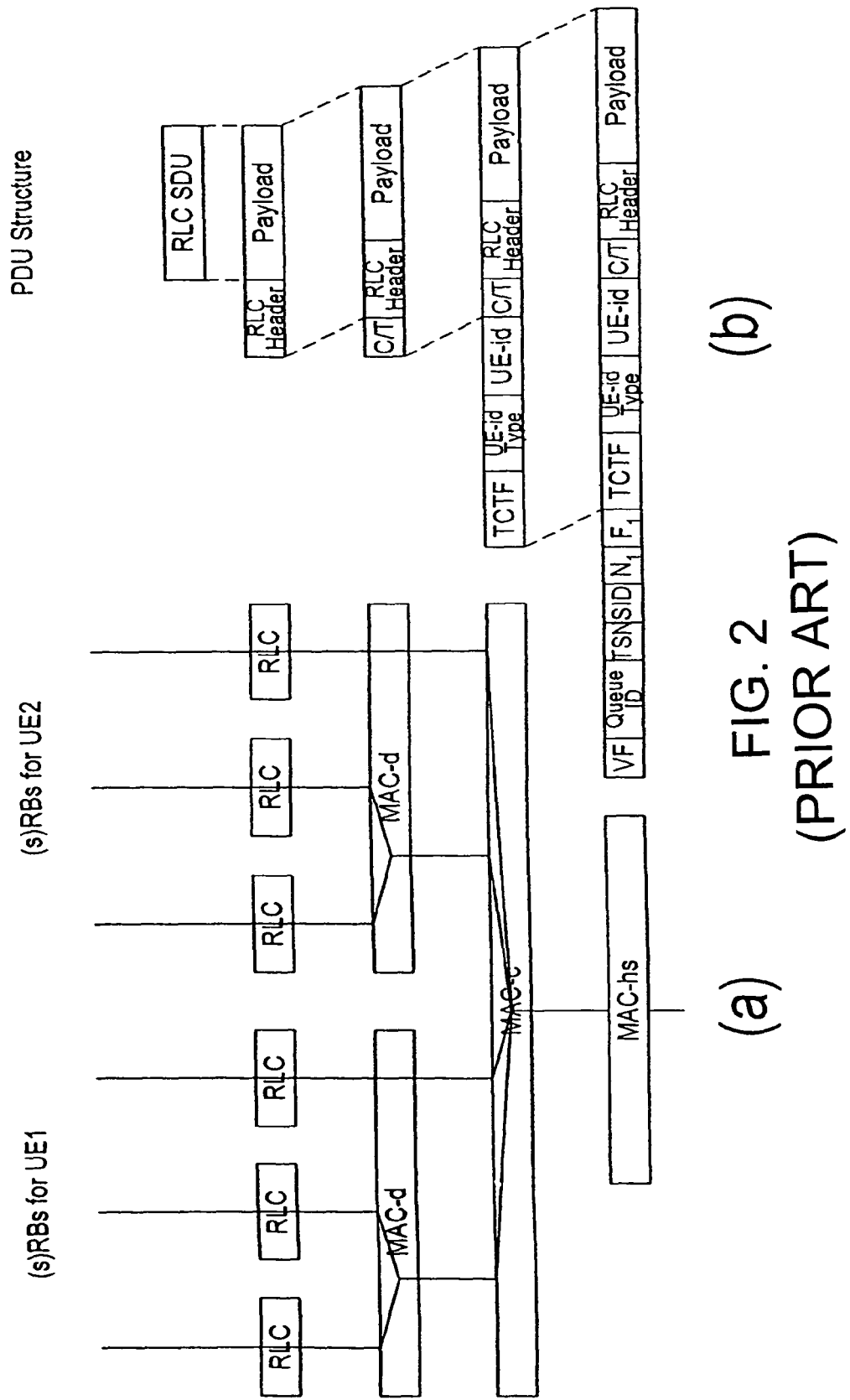
FIGS. 2a and 2b illustrate the multiplexing and L2 PDU structure based on Rel99 definitions.

The first improvement is to remove part of the MAC-c header, without any changes to MAC-hs header structure. As compared to FIG. 2b, the MAC-c header in FIG. 3b does not contain the TCTF, UE-id type and UE-id fields. As known in the art, TCTF (Target Channel Type Field) is used to identify the local channel routing for data on FACH and RACH transport channels, and UE-id type and UE-id fields are used to identify the UE on common channels. The UE-id type field indicates whether the subsequent UE-id is of type U-RNTI, C-RNTI or DSCH-RNTI. In the first improvement, the Queue ID, SID, $N_1$ and $F_1$ in the MAC-hs PDU, as shown in FIG. 2b, are kept. Among the parameters of the MAC header (HS-DSCH), Queue ID (Queue identifier) provides identification of the reordering queue in the receiver in order to support independent buffer handling of data belonging to different reordering queues; SID (Size index identifier) identifies the size of a set of consecutive MAC-d PDUs, N indicates the number of consecutive MAC-d PDUs with equal size; and F is a flag indicating whether more fields are present in the MAC-hs header.

The second improvement is to replace the Queue ID with Logical channel ID; and replacing SID, $N_1$ and $F_1$ with a Length field and an SC field, as shown in FIG. 3b. Furthermore, the C-RNTI and logical channel ID is carried from RNC to Node B in FP (Frame Protocol) header which is the mapping to the one priority (Node B) and reordering queue (UE) in HSDPA operation. By including Length field (bytes) and SC field to the MAC-hs instead of SID, N, and F fields, the segmentation can be done in node B instead of RLC. The Node B segmentation can take into account the available Transport block size in L1.

In addition, the multiplexing structure can be simplified by removing MAC-d multiplexing and MAC-c multiplexing and using MAC-hs multiplexing when including data from multiple logical channels from one UE to a single HS-DSCH TTI. Different UEs can be multiplexed in a single TTI by using multiple HS-SCCH and Rel5 code multiplexing. With these changes the MAC PDU structure is identical in CELL_FACH and CELL_DCH state when HS-DSCH is used for both states (assuming C/T mux is not used in CELL_DCH state). In the MAC PDU structure as shown in FIG. 2b, the C/T field is used to provide identification of the logical channel instance when multiple logical channels are carried on the same transport channel. The C/T mux is used when multiplexing of several dedicated logical channels onto one transport channel is used.

If the Logical channel ID is sent in the MAC-hs header, C/T field is no longer needed. This new Logical channel ID identifies the Logical channel type (e.g. CCCH) as well as the instance of that logical channel type (e.g. DTCH 3).

As the MAC-PDU structure remains identical between different CELL_FACH and CELL_DCH states, the UE can receive MAC PDUs correctly in the state transition procedure from CELL_FACH to CELL_DCH state even if SRNC has done CELL_FACH state PDU processing. The only change in UE DL (downlink) reception would be the synchronized UL (uplink) and the normal HS-DPCCH transmission. Additionally, the H-RNTI value can be potentially changed in reconfiguration, but that is not necessary and H-RNTI used in CELL_FACH state (dedicated for the UE due to mapping from C-RNTI) can be used also in CELL_DCH.

In the case when the UE has no valid C-RNTI and the UE is waiting for a common control channel (CCCH) message (RRC connection setup, RRC Connection Reject), the UE receives the HS-SCCH with Common H-RNTI (included in SIB or known by other means e.g. hard coded in specifications) and decodes the MAC-hs PDU. The PDU structure can be the same as that presented in FIG. 4*a* where header structure for SRB#0 for CCCH message is defined.

In the case when the UE has no valid C-RNTI and UE is waiting for a DCCH message (Cell update Confirm) with U-RNTI, the UE receives the HS-SCCH with Common H-RNTI (included in SIB or known by other means e.g. hard coded in specifications) and decodes the MAC-hs PDU, which indicates the U-RNTI. This MAC-hs PDU structure is the only exceptional format. The exceptional MAC-hs PDU structure can be identified either from the logical channel ID or the use of Common H-RNTI or combined usage of both. This exception MAC-hs PDU has two different MAC-hs headers as shown in FIGS. 4*b* and 4*c*.

In the case involving multimedia broadcast/multicast service (MBMS) that uses logical channels such as MTCH (MBMS point-to-multipoint traffic channel), MSCH (MBMS point-to-multipoint scheduling channel), and MCCH (MBMS point-to-multipoint control channel) for point-to-multipoint (p-t-m) transmission, and when the UE is receiving a MCCH or MTCH mapped on HSDPA, the UE receives the HS-SCCH either with Common H-RNTI (included in SIB for MCCH) or MBMS service specific H-RNTI indicated in MCCH, and it decodes the MAC-hs PDU. The PDU structure can be the same. The MAC-hs header for this case is shown in FIG. 4*d*.

In that case that the UE is receiving a BCCH or PCCH mapped on HSDPA, the UE receives the HS-SCCH with Common H-RNTI, included in SIB, and it decodes the MAC-hs PDU. The PDU structure can be the same, as presented in FIG. 4*e*.

In summary, in the method for improving the PDU structure, according to the present invention, the first change is to remove TCTF, UE-id type and UE-id fields in the MAC-hs header. The second change is to replace the Queue ID field with Logical channel ID field, replacing the SID, N1 and F1 fields with Length field and SC field. The third improvement is to remove the MAC-d and MAC-c multiplexing.

Implementation

FIGS. 3*a* and 3*b* present the multiplexing and PDU structure for HS-FACH operation, according to the present invention. The Logical channel ID is used to separate different logical channels and logical channel types and reordering queue. TSN is used for MAC-hs reordering after HARQ retransmissions as in Rel5, but the reordering is identified implicitly from the logical channel, and no separate reordering queue ID field is needed. Length indicates the length of the MAC-hs SDU (service data unit) in bytes. By repeating the header, data also from other logical channels can be multiplexed in the same transport block, as the UE compares the amount of data indicated in Length field and the transport block size.

FIGS. 4*a* to 4*e* illustrate the MAC-hs PDU structures for various signaling radio bearers (SRBs) and radio bearers (RBs). FIG. 4*a* shows the MAC-hs header for a signaling radio bearer (SRB #0) and the logical channel used being CCCH (common control channel). FIG. 4*b* shows the MAC-hs header for a signaling radio bearer (SRB#1) and the logical channel used being DCCH (dedicated control channel) with U-RNTH. FIG. 4*c* shows the MAC-hs header for the signaling radio bearers #2-4 and RBs (DCCH and DTCH messages) with UE dedicated H-RNTI in CELL_FACH or CELL_DCH state. FIG. 4*d* shows the MAC-hs header for the signaling radio bearers #2-4 with logical channels, such as MTCH, MSCH and MCCH, for MBMS point-to-multipoint transmission. FIG. 4*e* shows the MAC-hs header for signaling radio bearers #2-4 with logical channels such as BCCH and PCCH carried over HSDPA.

Figure 5A:
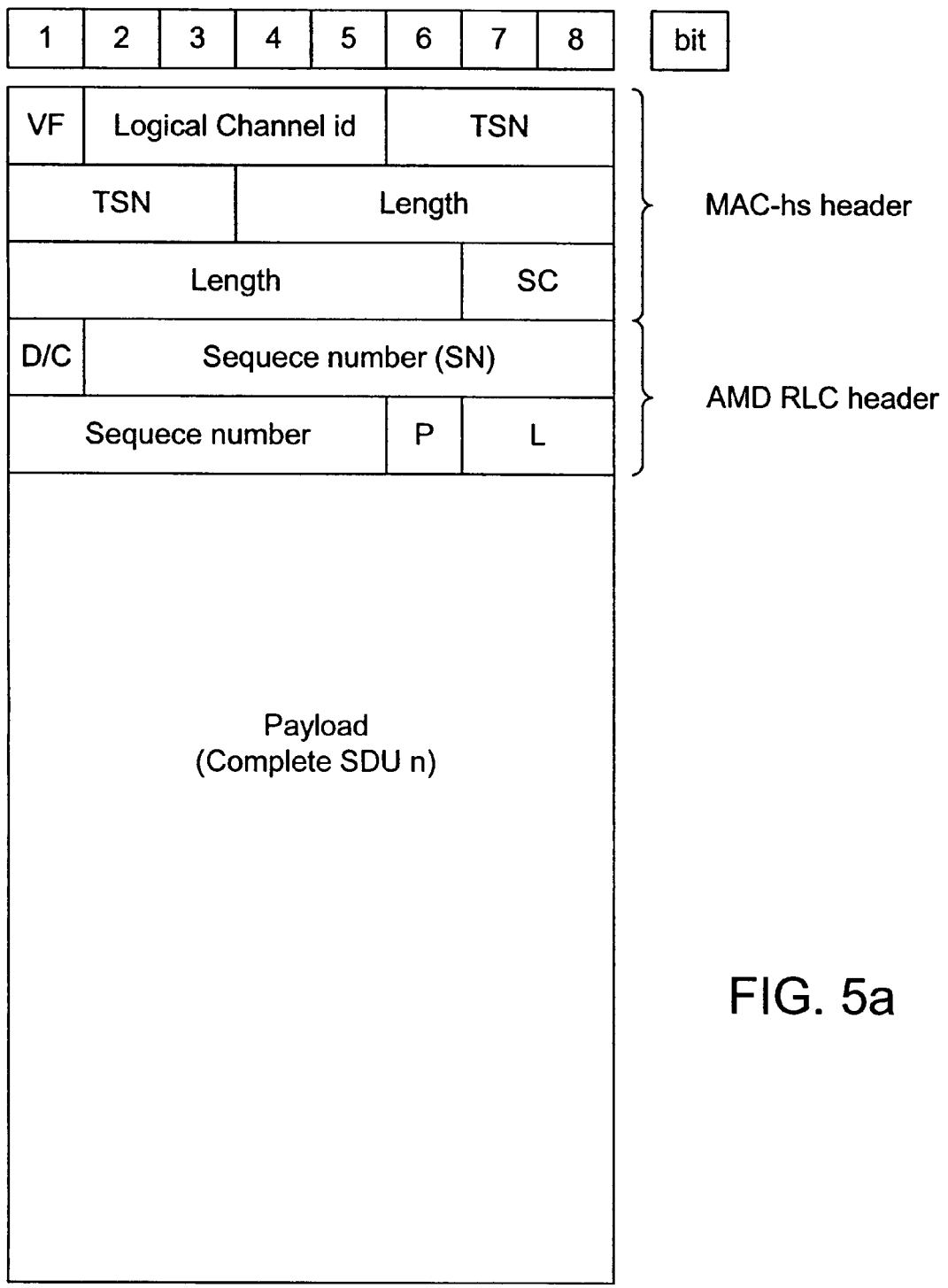
FIG. 5a shows an AMD-RLC and MAC-hs header structure, with a 3 octet MAC-hs header structure, according to the present invention.
Figure 5B:
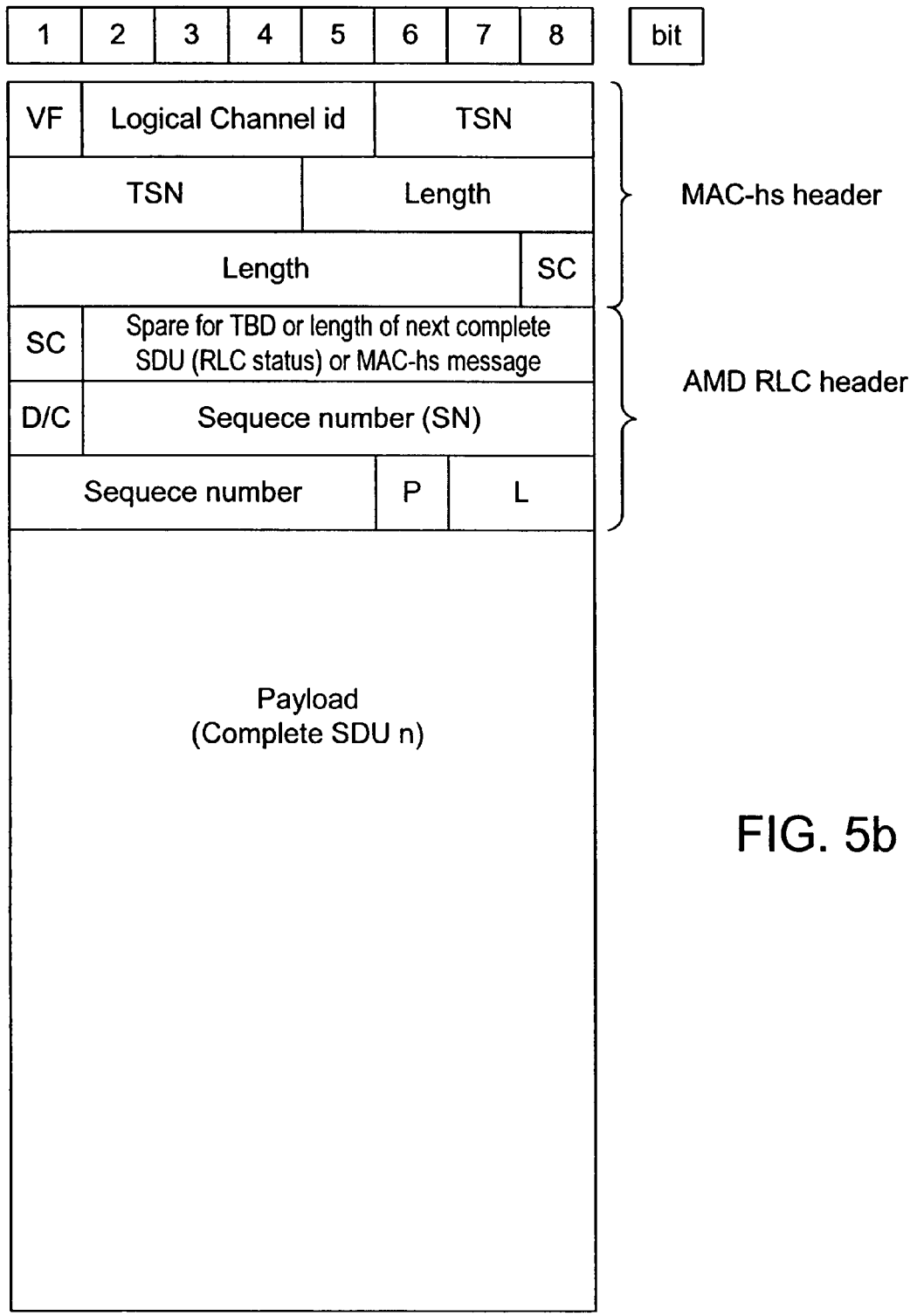
FIG. 5b shows an AMD-RLC and MAC-hs header structure, with a 4 octet MAC-hs header structure, according to the present invention.

FIGS. 5*a* and 5*b* present the full header structures including AMD-RLC and MAC-hs headers. The length of the RLC header is 2 octets and no length indicators are used. AMD PDU (Acknowledged Mode Data PDU) is used to convey sequentially numbered PDUs containing RLC SDU data. RLC uses AMD PDUs when it is configured for transferring acknowledged data.

The RLC AMD PDU structure, according to the present invention, supports simple segmentation with a 1 or 2-bit last segment flag (L) (a one-bit flag would be enough, but with two bits the beginning of the SDU can also be indicated). This is sufficient when concatenation at an RLC layer is not supported and if all the RLC PDUs are received correctly. If the PDU with last segment bit set is lost, the SC field is used to indicate the first segment of the SDU, 2-$n^{th}$ (=middle) segment of the SDU and last segment of the SDU, avoiding the problem of one missed RLC PDU. The P field contains a polling bit indicating whether a status report is required. The D/C field indicates whether the PDU is a control PDU or an AM PDU.

If the segmentation (at least partly) is moved from RLC to MAC, then MAC-hs has to support it in DL. The priority queue id (Queue ID) and C/T field are replaced by the Logical channel ID assuming that logical channel number is transferred in FP header in a similar manner as C-RNTI is also transferred in FP header. C-RNTI is transmitted over the air in HS-SCCH.

The Length field gives the length of the segment of MAC-d PDU (or equivalently RLC PDU assuming that MAC-d does not add any header) in bytes. SC field tells whether the segment is a complete SDU (=00), first segment (=01), last segment (=10) or a middle segment (=11), for example. Such an AMD PDU is shown in FIG. 5*a*.

Concatenation of MAC-d PDU segments of different MAC-d PDUs of the same or different logical channel is possible simply by repeating the three bytes header for each segment. The additional header can be either at the beginning after the first header or after the first payload together with the payload of the next segment. The existence of the additional header can be inferred by comparing the signaled TB size and the length field of the first header. If the smallest possible TB size is so large (more than 3 bytes larger than the MAC-hs header+payload) that an additional header fits in, then, e.g., the length field can be set to zero. Thus there is no need to explicitly indicate the number of segments/headers, as shown in FIG. 5*b*.

If the 15 different logical channel IDs are not sufficient, then either 5, 6 or 7 bits can be reserved for logical channel ID and the MAC-hs header size is extended to 4 octets to keep the octet align header structures. In this case, 7, 6, or 5 bits are reserved for future use or they can contain the length of the next complete SDU, which is concatenated from the same logical channel, e.g. TCP ACK. Alternatively, it is possible that Status PDU be piggybacked to MAC-hs PDU without the full 4-octet PDU structure. Fixed values can be defined for the reserved bits to indicate these optimizations in MAC-hs header. It is also possible that the field be used for MAC-hs control messages between Node B and UE.

The present invention has the following advantages:
1. L2 header overhead is reduced as C-RNTI is not needed in each PDU.
2. MAC multiplexing structure is simplified as only MAC-hs multiplexing is used.
3. MAC-hs reordering is done separately for each logical channel, removing the head of the queue blocking problem.
4. DCCH, DTCH can use identical L2 protocol header structure in CELL_DCH and CELL_FACH state.
5. Due to the identical header structure, the UE can receive the PDU correctly in CELL_FACH to CELL_DCH state transition and the only difference is the change of the uplink synchronization status and the potential usage of new H-RNTI.
6. Protocol architecture can be the same for CELL_FACH and CELL_DCH, i.e. if segmentation is moved from RLC to MAC-hs, the segmentation is done also in MAC-hs even if UE is in CELL_FACH state, and therefore segmentation can be performed based on physical layer requirement and data loss is minimized.
7. All PDUs are octet aligned, making the data processing simpler in UE and in UTRAN.
8. The utilization of RLC Length indicators can be avoided and thus the length indicator does not need to be configured either to 7 bit with maximum RLC PDU size of 127 octets or to 15 bit introducing always 2 octet overhead for small RLC SDUs. Additionally, the complexity of supporting simultaneously both 7 bit and 15 Length indicators can be avoided, when supporting flexible RLC PDU size between 40 bytes to 1500 bytes. Furthermore, the RLC SDU size of 40 bytes (TCP ACK) can be fitted to RLC PDU size of 336 bits, de-facto implementation of RLC PDU size in UL.
9. Only RLC concatenation (and partly RLC segmentation) is removed and other RLC functions do not change except for the piggybacked status, which is no longer used. Status PDUs are sent as separate RLC PDUs. A solution is presented for piggybacking the status PDU at MAC-hs level (with the four octet MAC-hs header).
10. Sequence number space problems can be avoided and the RLC processing load is decreased as bigger RLC PDUs sizes are used.

However, in order to fully utilize the MAC-hs PDU according to the present invention, a new MAC-hs structure must be defined and the piggybacked status is no longer available in RLC (but can be used at MAC-hs level instead).

The present invention is mainly described with HS-FACH (mapping data and signaling of the UE in CELL_FACH state on HS-DSCH) as an example. It should be noted as explicitly shown in FIGS. 4a to 4e that the MAC-hs and RLC PDU structures, according to the present invention, are applicable for other channels mapped on HSDPA in any RRC state of the UE.

UTRAN has been used as an example in this application. It should be noted that the same principles of RLC PDU structures and RLC functions, MAC-hs PDU structures and MAC-hs functions, etc. disclosed herein can be applied to other systems as well. One particular example is the long term evolution (LTE) of UTRAN currently being specified in 3GPP.

The present invention includes the following features:
1) for UE there can be C-RNTI allocated:
   1.1 for both UL (uplink) and DL (downlink) purposes ->C-RNTI is used for UL, and it is also mapped to H-RNTI in HS-SCCH;
   1.2 only for UL purposes and H-RNTI is allocated for DL;
   1.3 H-RNTI can have same value in CELL_DCH state as C_RNTI CELL_FACH ->So no change of UE id value is used in HS-SCCH during state transition;
2) UE in CELL_DCH state is able to receive data that is processed in RNC and Node B in CELL_FACH (common) state.
3) Regarding the common state, at least one of the following should be true:
   3.1 No UE context established to Node B by RNC or any other network element in the network, e.g., AGW (Access Gateway) in LTE;
   3.2 No UE id verification done for Node B by RNC or any other network element in the network, e.g., AGW in LTE;
   3.3 No network controlled mobility. Examples are CELL_FACH.

The above definition does not restrict the implementations where Node B and RNC are co-located in the same physical network element supporting functions of Node B and RNC. Nor implementations where Node B and AGW are co-located in same physical NW element supporting functions of Node B and AGW.

In the present invention, both Logical Channel (type and instance) and routing (re-ordering queue) are identified by the new Logical channel ID field. Idle mode is also used in RRC connection setup in addition to CELL_FACH and CELL_DCH state. The inventive features also include: same PDU structure is used in multiple RRC states; MAC-hs is only multiplexing layer for HS-DSCH transport channel.

Thus the present invention provides a method and structure for communicating a protocol data unit to/from a user equipment over a logical channel in a radio access network, the protocol data unit comprising a plurality of fields in a header section. The method comprises indicating the UE identity in out-of-band signaling, and identifying the logical channel and its routing in the protocol data unit in a common state. With the method and structure, according to the present invention, the receiver is able to know the format of the PDU by the out-of-band signaling of the receiver identity (i.e., the H-RNTI used can also tell the UE the format of the PDU to use for decoding). Furthermore, depending on the state of the receiver, the receiver knows which identity should be used in the out-of-band signaling. Alternatively, depending on the ID detected, the receiver knows the transmitter has moved from one state to another and the receiver moves the state as well. It is possible to use both identities for a certain period of time so as to synchronize the states more tightly. Moreover, the Node B can detect the state of the UE and which identity is being used by the UL activity (starting of ACK/NACKs will tell the Node B that the UE is using a different H-RNTI).

According to the present invention, the method further comprises indicating the field indicative of the logical channel being carried without indicating separately the logical channel type and/or logical channel instance, and not indicating the UE identity or UE Id-type in the protocol data unit.

The method also replaces the field indicative of reordering queue in the receiver by a field indicative of identity of the logical channel and replaces one or more of the fields in the header section indicative of number or size of one or more subsequent protocol data units by a field indicative of a length of the service data unit.

The method also comprises indicating that included data is first segment, mid segment or last segment of the SDU. When the protocol data unit is used in a high-speed medium access control layer, the protocol data unit is used to transfer data and signaling to the UE in Idle, CELL_FACH or CELL_DCH state and the protocol data unit as single multiplexing layer for multiplexing different logical channels to transport channel (High Speed Downlink Shared Channel).

One improvement regarding the PDU structure change, according to the present invention, is to allow continuous reception (without breaks in consecutive TTIs) of the HS-DSCH downlink channel during the state transition from CELL_FACH or CELL_PCH or URA_PCH (for UTRAN Registration Area) to CELL_DCH or vice versa.

One improvement regarding the PDU structure change, according to the present invention, is to allow HS-DSCH HARQ retransmissions to continue during the state transition from CELL_FACH to CELL_DCH or vice versa. This is possible as PDU structure in both states is identical and, from receiver point of view, there is no difference if some first HARQ transmission occurred in a different state than the last HARQ transmission when the PDU were able to be decoded correctly.

One improvement regarding the PDU structure change, according to the present invention, is to allow a variable MAC-hs SDU size by utilizing the length field.

One improvement regarding the PDU structure change, according to the present invention, MAC-hs segmentation and concatenation in CELL_DCH and CELL_FACH states. The segmentation is achieved by utilizing the length and SC fields and concatenation is achieved by repeating the header fields.

One improvement regarding the PDU structure change, according to the present invention, is to avoid length indicators in RLC to indicate SDU borders. This is achieved by using last field in the RLC header to indicate the end of the SDU. Thus, the Length field as shown in FIG. 3b is not used in order to allow the RLC to be flexible. The RLC header has a last segment flag (L) to indicate the last segment, a polling bit (P) to indicate a status report is required, and a D/C field to indicate whether the PDU is a control PDU or an AM PDU. It should be also noted that actual order of the different fields in MAC-hs protocol header not essential for this invention.

One improvement regarding the PDU structure change, according to the present invention, is to reduce the overall L2 overhead introduced by RLC and MAC layers in CELL_FACH, CELL_PCH, URA_PCH and CELL_DCH state.

The PDU, according to various embodiments of the present invention, is used for communications between various network components in a radio access network. The PDU can be communicated between a user equipment (UE) and another network component. As shown in FIG. 6a, the other network component can be a serving radio network controller (S-RNC), a controlling radio network controller (C-RNC) or a Node B. The PDU can also be communicated between Node B and S-NRC or C-RNC, as illustrated in FIG. 6b. The PDU can also be communicated between S-NRC and C-RNC, as illustrated in FIG. 6c. At least one of the network components, such as S-RNC, has an apparatus for handling the PDU for communicating to another network component. As shown in FIG. 7a, the apparatus comprises a module for segmenting the header of a PDU, and indicating the identity of a UE in the header for out-of-band signaling, or indicating the identity of a logic channel over which the PDU is communicated. The apparatus also has a transmitter to convey the PDU from one network component to another. In the receiving end of the PDU, as shown in FIG. 7b, the apparatus has a module configured for receiving the PDU and for obtaining the identity of the PDU sender or the identity of the logical channel over which the PDU is communicated. Based on the identity, the information processor identify the format of the PDU, for example. The apparatus may also have a module for enabling a HARQ soft combining during a state transition or during an uplink synchronization process.

In summary, the present invention provides a method, comprising:

indicating identity of a first network component in a radio access network in out-of-band signaling, the first network component configured for communicating a protocol data to a second network component over a logical channel in the radio access network, and identifying the logical channel and routing of the logical channel in the protocol data unit.

The logical channel and the routing are identified in the protocol data unit in common state or in dedicated state.

The first network component can be a user equipment device configured for communicating the protocol data unit in the radio access network, and the protocol data unit includes a common control channel (CCCH) message when the UE identity is transmitted by dedicated RRC signaling, i.e., out-of-band signaling in radio resource controller signaling.

The second network component comprises a serving radio network controller, and wherein the message is provided to the serving radio network controller configured for allocating the logical channel and the routing.

The protocol data unit may include dedicated control channel data for allocating the identity of the user equipment device, or dedicated traffic channel data for the user equipment device. In other words, if UE identity is UE specific and is uniquely allocated for the UE, the protocol data unit contains unique data for that UE—data from DCCH or DTCH.

The identity of the user equipment device is BCCH specific for broadcast control channel (BCCH) transmission.

The identity of the user equipment device can be indicated in a medium access control layer or in radio resource controller layer.

Furthermore, the logical channel has an identity and the protocol data unit comprises a plurality of fields in a header section, and one of the fields comprises information indicative of the identity of the logical channel, including logical channel type and instance.

When the second network component comprises a receiver in the radio access network and the protocol data unit is communicated to the receiver in a high-speed medium access control (MAC-hs) or enhanced high-speed medium access control (MAC-ehs) layer, the protocol data unit comprises a header section including a field indicative of reordering queue in the receiver, and wherein the logical channel has an identity, and the reordering queue can be indicated by the identity of the logical channel.

When the protocol data unit is communicated in a high-speed medium access control layer, the protocol data unit comprising a service data unit and a header section, the header section comprising one or more fields indicative of number or size of one or more subsequent protocol data units, the one or more of the fields in the header section can be replaced by a field indicative of a length of the service data unit.

When the protocol data unit is communicated in a high-speed medium access control layer, the protocol data unit is configured for transferring data and for signaling to the user equipment device in one or more of the idle state, a forward access channel (CELL_FACH) state and a dedicated channel (CELL_DCH) state.

According to one embodiment of the present invention, the protocol data unit is communicated in a high-speed medium access control layer, and the medium access control layer is configured for use as a single multiplexing layer for multiplexing different logical channels to a transport channel (High Speed Downlink Shared Channel).

According to another embodiment of the present invention, when the protocol data unit is communicated to a receiver in the radio access network, the protocol data unit having a format, and the receiver has a receiver identity, wherein the receiver is configured to recognize the format by the out-of-band signaling of the receiver identity.

According to a different embodiment of the present invention, the method for communicating a protocol data unit, the protocol data unit comprising a service data unit and a header section, comprises indicating in the header section whether one or more service data units are present in the protocol data unit by segmentation control field.

When the protocol data unit is communicated in a high-speed medium access control (MAC-hs) layer, and wherein said one or more service data units comprise a plurality of segments, the method further comprises indicating the segments of said one or more MAC-hs service data units in the header section of the protocol data unit.

When the protocol data unit is communicated in a radio link control protocol (RLC), and said one or more service data units comprise a plurality of segments, the method further comprises indicating the segments of said one or more RLC service data units in the header section of the protocol data unit. The one or more protocol data units comprise a first segment, a last segment and a mid segment located between the first and last segments. The one or more protocol data units may comprise indication of a last segment of the service data unit.

In yet another embodiment of the present invention, the protocol data unit having a format, and wherein at least the first network component is configured for changing from one state to another in a state transition, said method comprises receiving during the state transition with same PDU format processed by the first network component in different state than the second network component and enabling high-speed downlink shared channel (HS-DSCH) hybrid automatic repeat request (HARQ) soft combining during the state transition In a different embodiment of the present invention, the protocol data unit having a format, and method comprises receiving during uplink synchronization process with same PDU format processed by the first network component in different uplink synchronization status than the second network component and enabling high-speed downlink shared channel (HS-DSCH) hybrid automatic repeat request (HARQ) soft combining during the uplink synchronization process According to one embodiment of the present invention, the radio access network comprises an apparatus, which comprises:

a receiving module for receiving an identity of a first network component in out-of-band signaling, wherein the first network component is configured for communicating a protocol data unit to a second protocol network component in a radio access network; and a determining module for determining a format of the protocol data unit based on the identity.

According to another embodiment of the present invention, the radio access network comprises an apparatus, which comprises:

a receiving module for receiving an identity of the logical channel in a radio access network, wherein the radio access network comprising a first network component and a second network component, first network component configured for communicating a protocol data unit to a second protocol network component; and a determining module for determining a format of the protocol data unit based on the identity.

According to yet another embodiment of the present invention, the radio access network comprises an apparatus for use in a radio access network comprising a first network component and a second network component, the first network component and the second network component configured for communicating a protocol data unit (PDU) having a format, and wherein at least the first network component is configured for changing from one state to another in a state transition. The apparatus comprises:

a receiving module configured for receiving the protocol data unit during the state transition with same PDU format processed by the first network component in different state than the second network component and an enabling module configured for enabling high-speed downlink shared channel (HS-DSCH) hybrid automatic repeat request (HARQ) soft combining during the state transition According to a different embodiment of the present invention, the radio access network comprises an apparatus, the radio access network comprising a first network component and a second network component, the first network component and the second network component configured for communicating a protocol data unit (PDU) having a format. The apparatus comprises:

a receiving module configured for receiving the protocol data unit during uplink synchronization process with same PDU format processed by the first network component in different uplink synchronization status than the second network component and an enabling module configured for enabling high-speed downlink shared channel (HS-DSCH) hybrid automatic repeat request (HARQ) soft combining during the uplink synchronization process.

According to another embodiment of the present invention, an apparatus for use in a radio access network comprising a first network component and a second network component, the first network component and the second network component configured for communicating a protocol data unit (PDU), the PDU has a header section. The apparatus comprises:

a module for segmenting the header section into plurality of fields including a control field, and a module for indicating in the control field whether one or more service data units are present in the PDU.

In addition, the method of communicating a PDU may have the following features:

The identity of the user equipment device is associated with the logical channel in the out-of-band signaling.

When the protocol data unit is communicated in a medium access control (MAC-hs) layer, and protocol data unit comprising a header section, said method comprising:

indicating in the header section a size of a service data unit for transferring user data.

The user data comprises a plurality of data segments, the method further comprises indicating in the header section whether one or more data segments are present in the service data unit.

The identity of the user equipment device is provided in a message from said user equipment device requesting a radio resource controller connection, and the message is provided to a serving radio network controller in the radio access network, and the serving radio network is configured for allocating the logical channel and the routing in response to the message;

assigning a radio network temporary identity for the connection; and associating the identity of the user equipment device with the radio network temporary identity.

When the serving radio network controller is configured for sending a connection set-up message to the user equipment device confirming establishment of the connection, the user equipment device is configured to enter a dedicated channel state (CELL_DCH) and a forward access channel state (CELL_FACH), and wherein the protocol data unit used in the dedicated channel state and the protocol data unit used in the forward access channel state are identical.

When the user equipment device can be configured to enter an idle state and a terrestrial radio access (UTRAN) connection state, the method comprises using the protocol data unit for transferring data and signaling to the user equipment device in the idle or the terrestrial radio access state.

When the protocol data unit is communicated in a high-speed medium access control layer, the medium access control layer configured for use as a single multiplexing layer for multiplexing different logical channels to a transport channel, and the serving radio network controller is configured for sending a connection set-up message to the user equipment device indicating establishment of the connection, and the user equipment device is configured to enter a dedicated channel state (CELL_DCH) and a forward access channel state (CELL_FACH), the method further comprises using the protocol data unit in both the dedicated channel state and the forward access channel state when high-speed downlink shared channel (HS_DSCH) reception is enabled in the dedicated channel state and in the forward access channel state. When the user equipment device is also configured to enter a paging channel (CELL_PCH) state, the method further comprises using the protocol data unit in a transition from the forward access channel state or the paging state to the dedicated channel state when high-speed downlink shared channel (HS_DSCH) reception is enabled in the dedicated channel state, the paging state and the forward access channel state so as to maintain a continuous reception in consecutive transmission time intervals. The protocol data unit can be used in a transition between the forward access channel state and the dedicated channel state during high-speed downlink shared channel (HS_DSCH) hybrid automatic repeat request (HARQ) retransmissions.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method, comprising:

receiving, by a first network component in a radio access network during a state transition, a protocol data unit, the protocol data unit having a format, the protocol data unit arranged for communication between the first network component and a different second network component in the radio access network, wherein the first network component is configured for the state transition from a first state to a different second state, and wherein the format of the protocol data unit received by the first network component during the state transition is the same format of the protocol data unit communicated between the first network component and the second network component when the first network component is in the first state; and enabling high-speed downlink shared channel hybrid automatic repeat request soft combining during the state transition, wherein one of the first state and the second state comprises a dedicated channel state, and the other of the first state and the second state comprises one of a forward access channel state and a paging channel state.

2. The method according to claim 1, wherein the protocol data unit is configured for communication between the first network component and the second network component in a high-speed medium access control layer.

3. The method according to claim 1, wherein the second network component comprises a radio base station.

4. A method, comprising:

receiving, by a first network component in a radio access network during an uplink synchronization process, a protocol data unit, the protocol data unit having a format, the protocol data unit arranged for communication between the first network component and a different second network component in the radio access network, wherein the format of the protocol data unit received by the first network component during the uplink synchronization process is the same as the format of the protocol data unit before the uplink synchronization process; and enabling high-speed downlink shared channel hybrid automatic repeat request soft combining during the uplink synchronization process.

5. The method according to claim 4, wherein the first network component comprises a user equipment device in the radio access network.

6. The method according to claim 4, wherein the protocol data unit is configured for communication between the first network component and the second network component in a high-speed medium access control layer.

7. The method according to claim 4, wherein the second network component comprises a radio base station.

8. The method according to claim 4, wherein the first network component comprises an uplink synchronization status, and the first network component is configured to change the uplink synchronization status in the uplink synchronization process.

9. An apparatus, comprising:

a receiving module configured to receive a protocol data unit during a state transition, the protocol data unit arranged for communication between a first network component and a different second network component in a radio access network, wherein the first network component is configured for the state transition from a first state to a different second state, wherein the format of the protocol data unit received during the state transition is the same as the format of the protocol data unit when the first network component is in the first state; and an enabling module configured to enable high-speed downlink shared channel hybrid automatic repeat request soft combining during the state transition, wherein one of the first state and the second state comprises a dedicated channel state, and the other of the first state and the second state comprises one of a forward access channel state and a paging channel state.

10. The apparatus according to claim 9, wherein the protocol data unit is configured for communication between the first network component and the second network component in a high-speed medium access control layer.

11. The apparatus according to claim 9, wherein the second network component comprises a radio base station.

12. An apparatus, comprising:
a receiving module configured to receive a protocol data unit during an uplink synchronization process, the protocol data unit having a format, the protocol data unit arranged for communication between a first network component to a different second network component in a radio access network, wherein the format of the protocol data unit received during the uplink synchronization process is the same as the format of the protocol data unit before the uplink synchronization process; and
an enabling module configured to enable a high-speed downlink shared channel hybrid automatic repeat request soft combining during the uplink synchronization process.

13. The apparatus according to claim 12, wherein the first network component comprises a user equipment device in the radio access network.

14. The apparatus according to claim 12, wherein the protocol data unit is configured for communication between the first network component and the second network component in a high-speed medium access control layer.

15. The apparatus according to claim 12, wherein the second network component comprises a radio base station.

16. A method, comprising:
receiving, by a first network component in a radio access network during transition, a protocol data unit, the protocol data unit having a format, the protocol data unit arranged for communication between the first network component and a different second network component in the radio access network, wherein the first network component is configured for the state transition from a first state to a different second state, and wherein the format of the protocol data unit received by the first network component during the state transition is the same format of the protocol data unit communicated between the first network component and the second network component when the first network component is in the first state; and
enabling high-speed downlink shared channel hybrid automatic repeat request soft combining during the state transition, wherein the first network component comprises a user equipment device in the radio access network, and wherein the first state comprises an idle state.

17. An apparatus, comprising:
a receiving module configured to receive a protocol data unit during a state transition, the protocol data unit arranged for communication between a first network component and a different second network component in a radio access network, wherein the first network component is configured for the state transition from a first state to a different second state, wherein the format of the protocol data unit received during the state transition is the same as the format of the protocol data unit when the first network component is in the first state; and
an enabling module configured to enable high-speed downlink shared channel hybrid automatic repeat request soft combining during the state transition wherein the first network component comprises a user equipment device in the radio access network, and wherein the first state comprises an idle state.

* * * * *